2 Sheets—Sheet 1.
T. C. LORD.
Check Rowing Attachment for Corn Planters.
No. 232,137.          Patented Sept. 14, 1880.
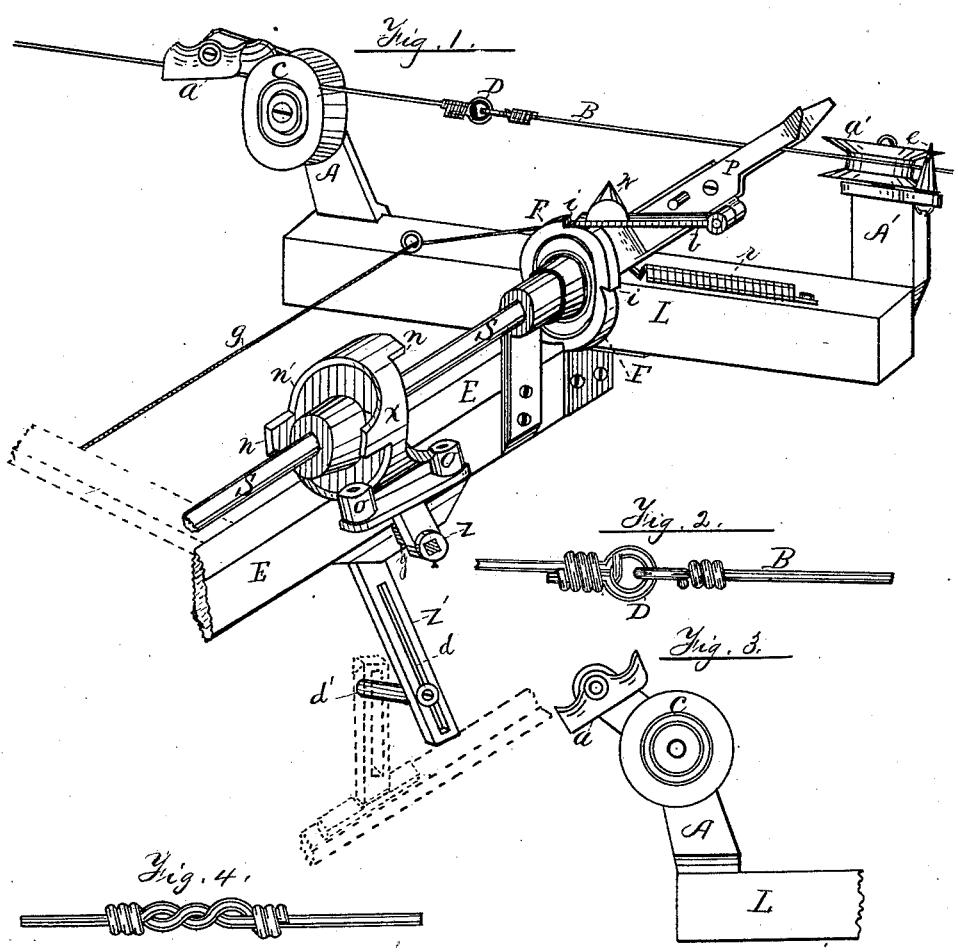
Witnesses:
Thos. H. Hutchins,
Wm. J. Hutchins.
Inventor:
Tyler C. Lord.

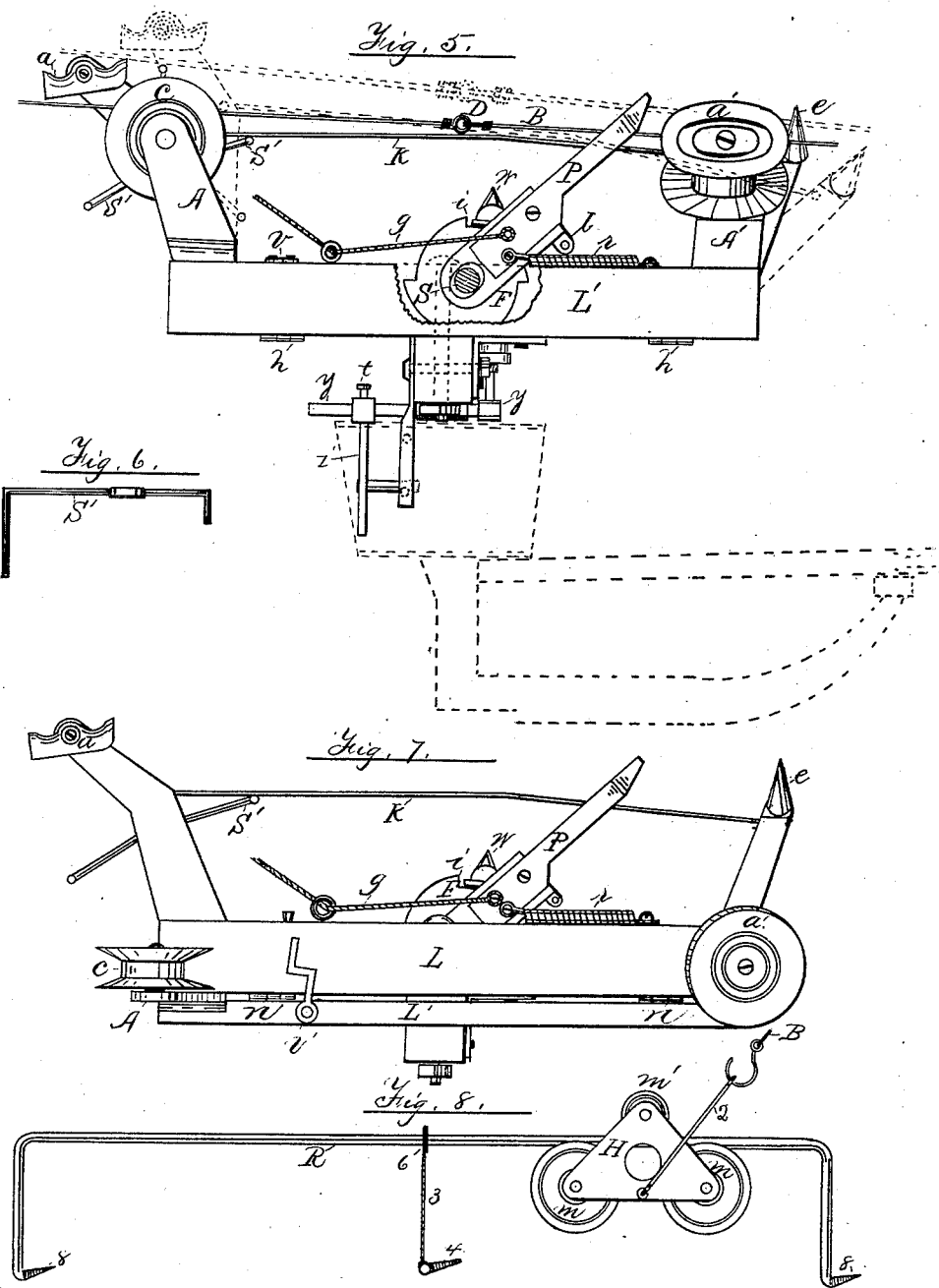

UNITED STATES PATENT OFFICE.

TYLER C. LORD, OF JOLIET, ILLINOIS.

CHECK-ROWING ATTACHMENT FOR CORN-PLANTERS.

SPECIFICATION forming part of Letters Patent No. 232,137, dated September 14, 1880.

Application filed February 6, 1880.

*To all whom it may concern:*

Be it known that I, TYLER C. LORD, of the city of Joliet, in Will county and State of Illinois, have invented certain Improvements in Check-Rowing Attachments for Seed-Planters, the construction and operation of which I will proceed to explain, reference being had to the annexed drawings, making a part of this specification, in which—

Figure 1 is a perspective view; Fig. 2, a perspective view of the operating-cable; Fig. 3, a side elevation of two guides for the cable; Fig. 4, a perspective view of an operating-cable; Fig. 5, an end elevation; Fig. 6, a perspective view of the lever S'; Fig. 7, an end elevation, showing the hinge L'; and Fig. 8, a plan view of the anchor to hold the cables.

This invention relates to a device to be attached to a corn or seed planter to operate the seed-slide automatically, and so constructed that it may be attached to the ordinary planter on the top, across the seed-boxes, and caused to operate by means of a rope, chain, or cable stretched across the field and anchored at either end, and having knots, joints, or enlargements at regular intervals, to engage with and operate the dropping attachment.

Fig. 5 in the drawings shows an end view of the device mounted on the top of the seed-planter, (shown by the dotted lines,) and Fig. 1 shows a perspective of one half of the device dismounted, each end of which is constructed in duplicate, making it unnecessary to so represent but one end.

The details of the construction are substantially as follows: E is the main beam, reaching from one seed-box to the other, and bears all the working parts. L is a cross-bar at and mounted crosswise on the end of the beam E, and supports one end of the shaft S, which is caused to rotate in an intermittent manner, by means of joints or enlargements D along on the cable B, as the forked lever passes along astride of the cable B.

When the forked lever P comes along to a joint or enlargement, D, the lever P is arrested in its progress forward, and is turned backward until it slips off the knot or enlargement D, and springs forward by means of the spring $r$. Each time the lever P is arrested, as stated, and carried backward, it rotates the shaft S one-fourth the way around by means of the pawl $b$, which is hinged to the side of the forked lever P, engaging with the notches $i$ of the ratchet-wheel F.

The cable B is held in its place and guided by means of the sheave-wheels $c$ and $a'$, which are deeply grooved, and the rocking shoe $a$ and conical roller $e$, as is shown in Figs. 1 and 5. The shoe $a$ serves to hold the cable B down in the grooved sheave $c$, and the conical roller $e$ serves to prevent the cable B from leaving the groove of the sheave $a'$.

A and A' are upright pieces that are attached to the cross-bar L and support the sheaves $c$ and $a'$ and shoe $a$ and conical roller $e$. About central on the shaft S is located the double escape-wheel $x$, having the two inclines $n'$ and the two offsets $n$ on either side, alternating with each other, as shown in Fig. 1. The offsets $n$ are directly opposite the center of an incline, $n'$, on the opposite side, so that when it rotates with its inclines and offsets between the two rollers $o$ on the rocking shaft $y$, causing it to oscillate or rock from side to side, a corresponding motion is given to the lower lever, $z'$, on its rear end, which connects with a sliding bar below, that traverses the seed-boxes, causing the seed-bar to slide back and forth to drop the seed. The dotted lines below the lever $z'$ represent the seed-bar.

Each time the escape-wheel $x$ rotates one-fourth around it leaves the lever $z'$ locked, as is shown in Fig. 1, so it cannot move by means of a sudden jar or by accident. This is accomplished by the planes on the ends of the offsets $n$ and the plane at the foot of the inclined plane $n'$ on the opposite side of the offset $n$, against which two planes the rollers $o$ engage while at rest.

In Figs. 5 and 7, K represents a rod connecting the standards that support the rocking shoe $a$ and conical roller $e$, which standards are hinged at their lower ends to the side of the cross-bar L. This rod is for the purpose of enabling the operator by its means to remove the rocking shoe $a$ and conical roller $e$ from the sheaves $c$ and $a'$, so as to lift out the cable B from the sheaves to disengage it from the machine, the dotted lines showing the position of the rocking shoe $a$ and conical roller $e$ so disengaged.

The cross-bar L is constructed in two parts,

L and L', as shown in Fig. 7, which two parts are hinged together at their lower side by the hinges $h$, Fig. 5. This is for the purpose of lowering the sheaves $c$ and $a'$, as is shown in Fig. 7, to unship or dump the cable out of the sheaves, off the machine, after the shoe $a$ and conical roller $e$ are out of the way, as shown by the dotted lines in Fig. 5. When the cross-bar L' is raised up again it is hooked to the cross-bar L by the hook $v$. S' is a lever, by means of the outer end of which the cable B is held up out of the sheave $c$ until the cable is so dumped.

The cord $g$ is used to pull the forked levers over backward, and to hold them in that position when it is desired not to operate the dropper, as the knots or joints in the cable slide over the forked levers P, and do not operate them when they are so held back.

The knots or joints D on the cable B are calculated to be placed at regular intervals along its length wherever it is desired to drop seed, so that the hills of grain will be exactly opposite each other, making it unnecessary to mark the ground in either direction in advance of planting.

The forked lever P fits loosely on the end of the shaft S, as is shown in Fig. 5, so that the lever P will have free play to accommodate itself to the varied motions of the machine and irregularities of the cable, and preventing the cable from escaping from its forked end.

W is a weight on the lower end of the pawl $b$, to hold that end down to its work on the ratchet-wheel F.

The cable joints or knots D are formed as shown in Fig. 2, the short ends running parallel with the main strand, and not wound around it, but held by a separate short bit of wire, one end passing through the loop to hold the binding-wire on and in place; or the joint D may be formed by twisting the two ends of the cable-wire together, as is shown in Fig. 4.

Fig. 8 shows the anchor by means of which the cable B is fastened at either end of the field, consisting of the long rod R, having the prongs S to force in the ground to hold it in place. Along this rod R the clevis (formed of the three grooved rollers, $m$ and $m'$, held together by opposite plates, H) rolls from one end to the other as the machine plants the rows.

By having the anchor-rod R long it obviates the necessity of moving it until several rows are planted, as the clevis rolls along to carry the cable B opposite the row to be planted for several rows, the grooved rollers permitting the cable to move along more easily than it would without them.

As the anchor is long, it would bend at the center, to prevent which the ring 6, with the cord 3 and stake 4, is used to stake it fast at the center to hold it firm. When it becomes necessary to allow the clevis to pass it, it is removed until the clevis passes, and is then fastened, as before, as several rows may be planted on either side of it before it is necessary for the clevis to pass the center of the anchor.

The rocking shaft $y$ receives on its inner end the upper end of the lever $z'$, along on which shaft the lever $z'$ may be placed and held by the set-screw $t$, as shown in Fig. 5, so it may accommodate itself to any planter.

A longer or shorter motion may be given to the sliding seed-bar by adjusting the wrist $d'$ at any place along in the slot $d$ in the lever $z'$, as shown in Fig. 1.

The wheels constituting the clevis of the anchor are grooved to inclose and roll on the rod R, the grooves serving to hold the clevis on. In this case three rollers are shown; but any number may be used that may be thought necessary; but in any case the grooves should be preserved.

Having thus described my invention, what I claim as new, and desire to secure by Letters Patent, is as follows, to wit:

1. The combination of the cross-bar L and standards hinged to its side, rod K, and lever S', for the purpose of disengaging the knotted wire B from the sheaves, as set forth.

2. The two cross-bars L and L', in halves hinged together, the part L' arranged to fall over and dump the cable B, as and for the purpose set forth.

3. The cord $g$, in combination with the forked lever P, arranged to operate as and for the purpose set forth.

4. The combination and arrangement of the beam E, cross-bars L and L', shaft S, double escape-wheel $x$, ratchet-wheel F, forked lever P, pawl $b$, standards A and A', shoe $a$, sheaves $c$ and $a'$, conical roller $o$, and lever $z'$, to operate in the manner and for the purpose set forth.

TYLER C. LORD.

Witnesses:
THOS. H. HUTCHINS,
WM. J. HUTCHINS.